Dec. 6, 1927. Re. 16,806

A. REEVES

LIFTING JACK

Original Filed Aug. 9, 1922 2 Sheets-Sheet 1

Inventor
Alfred Reeves
By his Attorneys
Marks & Clerk

Dec. 6, 1927. Re. 16,806

A. REEVES

LIFTING JACK

Original Filed Aug. 9, 1922 2 Sheets-Sheet 2

Inventor
Alfred Reeves
By his Attorneys
Marks + Clerk

Reissued Dec. 6, 1927. Re. 16,806

UNITED STATES PATENT OFFICE.

ALFRED REEVES, OF SMALL HEATH, BIRMINGHAM, ENGLAND, ASSIGNOR OF ONE-HALF TO GEORGE HERBERT CUMING BUTLER, OF BIRMINGHAM, ENGLAND.

LIFTING JACK.

Original No. 1,534,992, dated April 21, 1925, Serial No. 580,713, filed August 9, 1922. Application for reissue filed December 21, 1926. Serial No. 156,242.

The present invention has relation to lifting jacks of the type involving a lazy tongs construction and which are particularly suitable for raising the motor cars and like vehicles, and has for its object to provide a jack of simple construction and efficient action and which is cheap to manufacture.

According to the present invention a double toggle lever or lazy tongs construction is mounted upon a suitable base and is adapted to be extended or contracted by a rod having left and right hand screw threads engaging respectively opposite pivot points of the said double toggle lever or lazy tongs construction. The invention further comprehends improved handle operating means for lifting jacks hereinafter described and claimed.

In order that this invention may be clearly understood and readily carried into practice, reference may be had to the appended explanatory sheet of drawings, upon which:

Figure 1:
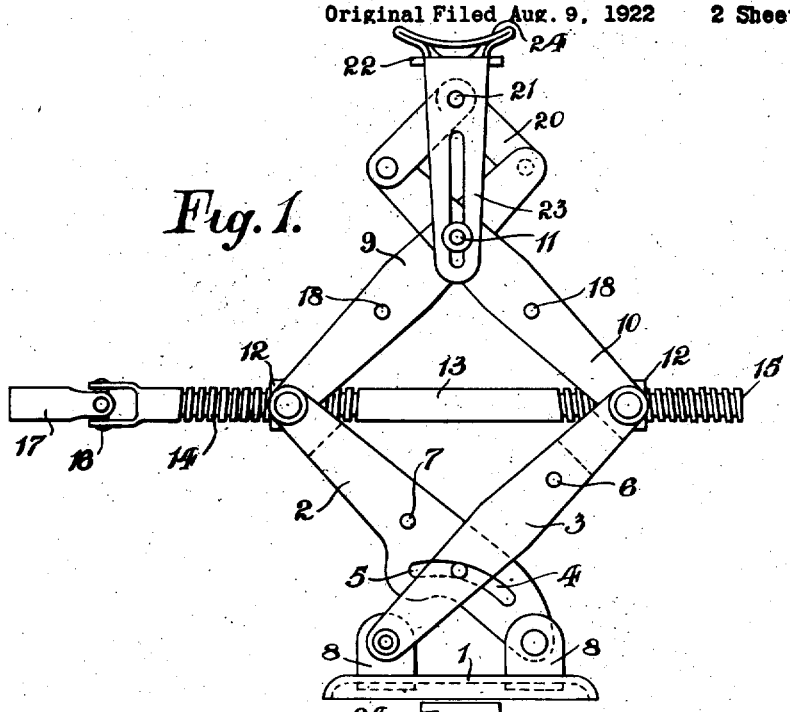
Figure 1 is a front elevation.
Figure 2:
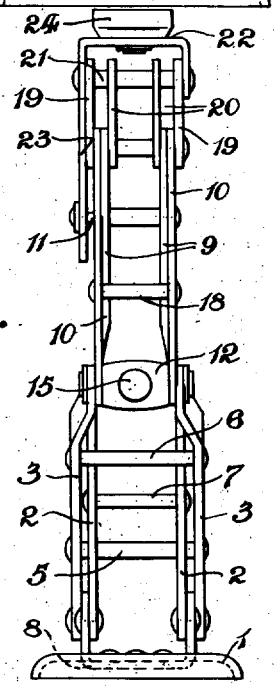
Figure 2 is an edge elevation of a lifting jack construction according to the present invention.

In an embodiment of the present invention the double toggle lever construction is mounted upon a suitable base plate 1 and virtually constitutes a lazy tongs construction which is adapted to be opened or extended for the lifting operation. Two pairs 1 and 3 of lower toggle levers have their lowest extremities suitably pivoted to the base plate 1 a short distance apart, and these pairs of dual toggle levers cross one another at a point not far removed from the base and extend obliquely upwardly when the device is extended. Conveniently the pair of levers 2 are mounted between the opposite pair of levers 3 and said inner levers 2 have an arc-shaped slot 4 adapted to accommodate a transverse pin 5 uniting the adjacent toggle levers, the arrangement being such that the pin operates in the slot in the extending or collapsing operation of the jack. The corresponding levers may be strengthened by further transverse uniting pins 6 and 7. The lower extremities of the levers 2 and 3 are conveniently pivoted to the limbs of U or channel shaped members 8 which are suitably secured to a sheet metal or other base 1 a short distance apart. These U-shaped or channel members may be permanently connected to the base by passing the limbs through slots in the base and accommodating the connecting part beneath the said base which is of a shallow trough formation for this purpose. Alternatively the U or channel shaped strips may be rivcted, bolted or otherwise secured to the base. The upper extremities of the lower toggle levers 2 and 3 are pivotally connected to two pairs of upper toggle levers 9 and 10 which cross one another and are intermediately pivoted at 11 being diagonally disposed when the jack is in the extended position. These upper toggle levers each involve two corresponding links 9 and 10 pivoted to the upper extremity of the lower toggle levers 2 and 3 and blocks or bearing pieces 12 are pivotally mounted at the junction of the upper and lower toggle lever system, and a rod 13 is adapted to pass through such blocks or bearing pieces having left and right-hand screw threads 14 and 15 which engage corresponding internal screw threads in the said blocks 12 or bearing pieces. The extremity of this rod is provided with a universal joint 16 and a square socket member 17 for receiving the extremity of an operating rod with a handle such as that hereinafter described. The upper toggle levers 9, 10 as aforestated are crossed and pivotally united at a short distance from their upper extremities and may suitably be braced by cross pins 18, and said upper toggle levers at their extreme upper ends carry two pairs of short upper links 19, 20 which are pivoted to the said upper toggle levers and at their other extremities pivoted to a small transverse shaft 21. A horizontal platform 22 involving a U-shaped member is also pivotally mounted upon this shaft and one limb 23 of this U-shaped member is extended vertically downwardly and is longitudinally slotted and adapted to engage the axis pin 11 which unites the upper toggle levers 9, 10 not far removed from their upper extremities. The platform may have a small plate or disc 24 pivoted or revolubly mounted centrally thereon to accommodate itself to the part of the vehicle it is adapted to engage in the lifting process.

In operation upon the rotation of the rod 13 having the left and right-hand screw threads the pivot points between the upper and lower toggle lever systems are moved further away from one another or closer to one another to collapse or extend the jack, and on account of the downwardly extending limb 23 of the platform slidingly engaging the pivot aforementioned of the upper toggle levers, the said platform is always retained in a vertical position. Further the horizontal operating rod 13 of the apparatus always remains in a horizontal position in the operation of the jack, and the arrangement is such that when the jack is completely collapsed same occupies a very little space, the upper and lower toggle levers lying in substantial adjacency, with the horizontal rod, the slotted limb part of the platform being accommodated between the now side by side upper and lower toggle levers. The slot and pin mechanism of 4 and 5 the lower toggle links is adapted to positively limit the extension and contraction of the jack.

Figures 3, 4, 5:
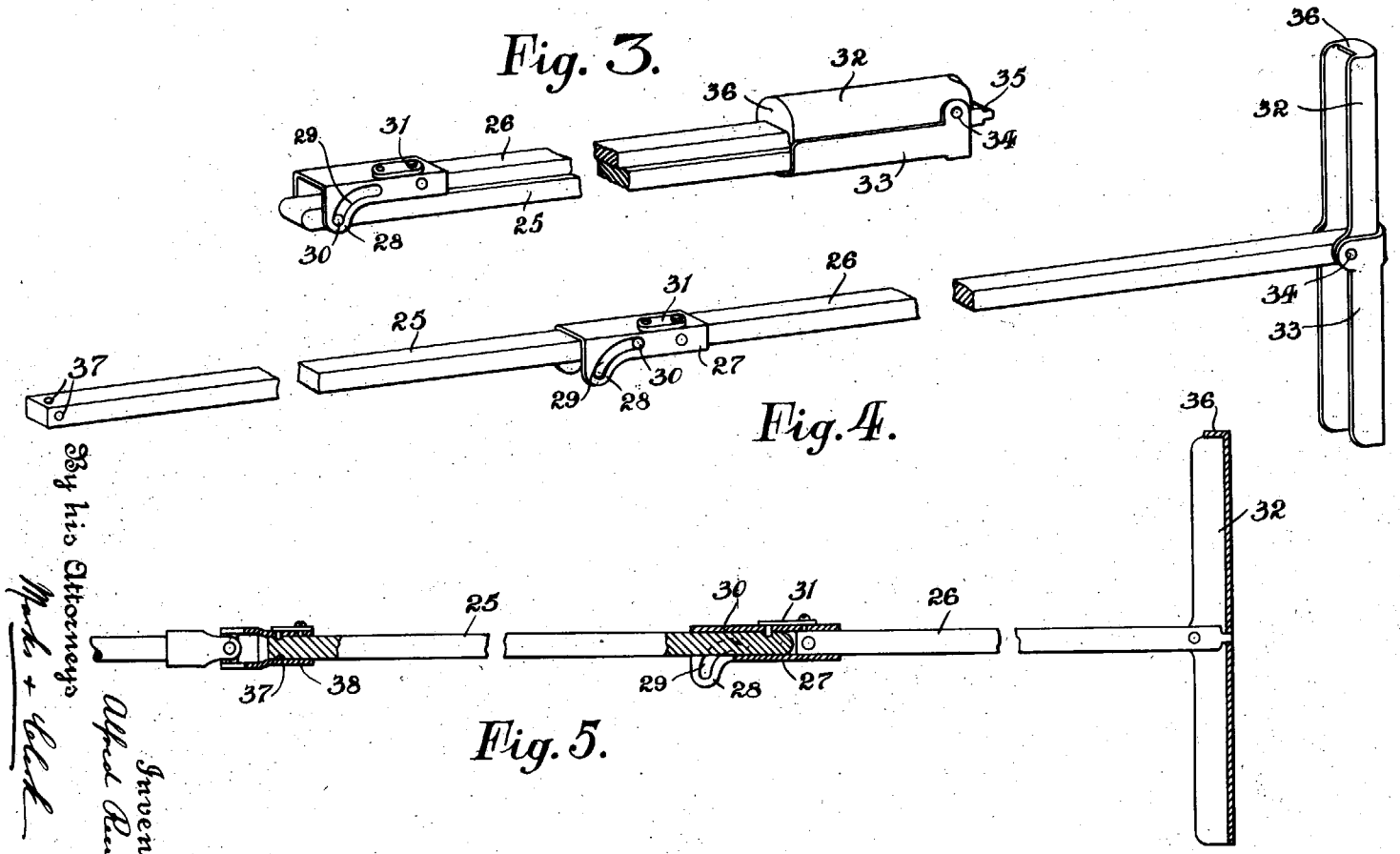
Figure 3 is a fragmentary perspective view of an operating handle constructed according to the present invention in the collapsed condition.
Figure 4 is a fragmentary perspective view of the same handle in the extended condition and Figure 5 is a fragmentary elevation of the handle illustrating parts in longitudinal section.

A suitable handle for operating the jacks is comprised of two lengths of rod 25 and 26 of square section which are pivotally united so that they may be brought into alignment or pivoted into adjacency with one another as shown in Figures 3 and 4 respectively. To this end the rod 26 is provided at its extremity with a hollow tube or housing 27 of square section and this housing which is open at its projecting extremity is provided with two laterally projecting lugs or ears 28. An L or equivalently shaped slot 29 is provided upon each side of the housing 27, one limb of each slot extends along the projecting lug or ear 29 and the other limb along the housing or hollow tube 27. The adjacent extremity of the other rod part 26 is introduced into the housing 27 and is provided with two oppositely projecting lugs or trunnions 30 adapted to operate in the L-shaped slots 29. A spring blade 31 is attached externally to the housing and is provided with a small stud passing through an aperture in the housing and adapted to co-operate with a recess in the rod, carrying the projections or trunnions as shown in the Figure 5. The hinge operates as follows.

When it is desired to have the parts 25 and 26 of the rod in rigid alignment for operation of the jack (Figures 4 and 5) that part of the rod carrying the trunnions 30 is slid into the housing 27, its projections moving along the slots in such housing and the spring controlled stud device 31 retains the parts in rigid engagement whereby the rotative or other effort can be imparted to the jack. When it is desired to bring the two parts 25 and 26 into adjacency, the rod part carrying the projections or trunnions 30 is slid from out the housing and the projections caused to move in the slots 29 into the projecting lugs carried by the said housing, and in this position the two rod parts, which are conveniently of a similar length can be brought into adjacency. Two handle parts 32 and 33 are pivoted to the rod 26 carrying the housing at the opposite extremity of such rod. Each handle part is preferably stamped up to a substantially U section and its extremity is slotted between the limbs of the U-formation and said limbs are passed one on each side of the rod 26 and are pivotally connected thereto by a rivet or pin 34 passing through the four limbs and through the rod. The rod at its extreme end is provided with a small projecting central tongue 35, this is adapted to bear against the slotted parts of each handle to limit their opening movement when they are extended to a T-construction. When the handle is collapsed, the two parts 32 and 33 are brought into adjacency, and on account of their hollow or substantially U-section they completely enclose the extremities of the rods 23 and 26 as shown in the Figure 3. From the aforegoing description, it will be seen that an operating rod is provided which is of a collapsible character, and the handle part is adapted to fold to hold the parts of the rod in the collapsed condition, the whole apparatus occupying a very little space, and being readily stored in a tool box or like container in a vehicle. Instead of employing a square section rod, circular, oval or other section rod or bar may be employed being suitably adapted at its extremity for engaging the usual square socket in the lifting jack. The part 32 of the U-section handle may be partially closed at its extremity as shown at 36 and the opposite part or limb which is adapted to embrace the major part of the two rods when folded may be left open for this purpose. The extremity of the rod 25 may have four or other suitable number of recesses 37 adapted to cooperate with a spring controlled stud device carried by the square socket 38 on the jack.

Other modes of applying the principle of my invention may be employed instead of the one explained, change being made as regards the mechanism herein disclosed, provided the means stated by any of the following claims or the equivalent of such stated means be employed.

What I claim is:—

1. In a lifting jack, a base element, lazy tongs comprising a lower set of crossed links pivotally mounted at their lower ends on stationary pivots on said base element, a series of links of progressively diminishing length, the lower pair of which are pivotally connected to the upper ends of the first named links, a horizontal operating rod having oppositely threaded portions engaging the pivot portions of the major links, a platform on the upper portion of the lazy tongs having downwardly extending arms pivotally connected thereto, and one of said arms having a vertical slot and the lazy tongs having a connecting pivot pin which operates in said slot.

2. In a lifting jack, the combination of a base element, lazy tongs having crossed links pivotally mounted at their lower ends on said base element, several pairs of other links, one pair being pivotally connected to the upper ends of said first named links, means for extending and collapsing said links and interengaging elements on the lower overlapping portions of said two first named links adapted solely by their interengagement with each other to cause said two first named links to have equal angular displacement and to be maintained at the same angular relation to the plane of said base.

3. In a lifting jack, the combination of a base element, lazy tongs having a pair of crossed links pivotally mounted at their lower ends on said base element, several pairs of other links, one pair being pivotally connected to the upper ends of said first named links, means for extending and collapsing said links, a platform on the upper portion of the lazy tongs having a downwardly extending arm pivotally connected to said tongs and having a vertical slot, a connecting pivot pin on the lazy tongs adapted to operate in said slot, and interengaging elements on the lower overlapping portions of said two first named links adapted solely by their interengagement with each other to cause said two first named links to have equal angular displacement and to be maintained at the same angular relation to the plane of said base.

4. In a lifting jack, the combinations of a base element, lazy tongs having links pivotally mounted at their lower ends on said base element, several pairs of other links, one pair being pivotally connected to the upper ends of said first named links, means for extending and collapsing said links, one of said first named links having a curved slot therein and the other thereof having an element movably engaging in said slot and serving to thereby maintain said links at equal angles to the plane of said base, irrespective of the angular elevation of said links.

5. In a lifting jack, the combination of a base element, lazy tongs having links pivotally mounted at their lower ends on said base element, several pairs of other links, one pair being pivotally connected to the upper ends of said first named links, means for extending and collapsing said links, one of said first named links having an extension and a curved slot extending into said extension, and the other thereof having an element movably engaging in said slot and serving to thereby maintain said links at equal angles to the plane of said base irrespective of the angular elevation of said links.

6. In a lifting jack, the combination of a base element, a lower set of crossed links pivotally mounted at their lower ends on said base element, an upper set of links pivotally connected at their lower ends to the upper ends of said first set of links, operating means for extending and collapsing said links and means comprising interengaging elements on the overlapping portions of said crossed links adapted solely by their interengagement with each other to cause the crossed links to have equal angular displacement imparted thereto when actuated by said operating means.

7. In a lifting jack, the combination of a base element, a lower set of crossed links pivotally mounted at their lower ends on said base element, an upper set of links pivotally connected at their lower ends to the upper ends of said first set of links, operating means for extending and collapsing said links, and an element mounted on one of said crossed links adapted to engage within a suitably shaped slot in the other of the crossed links whereby said crossed links will have equal angular displacement imparted thereto when actuated by said operating means.

In testimony whereof I affix my signature.

ALFRED REEVES.